(No Model.)
W. F. BRACKETT.
DRAWING IMPLEMENT.
No. 379,206. Patented Mar. 13, 1888.
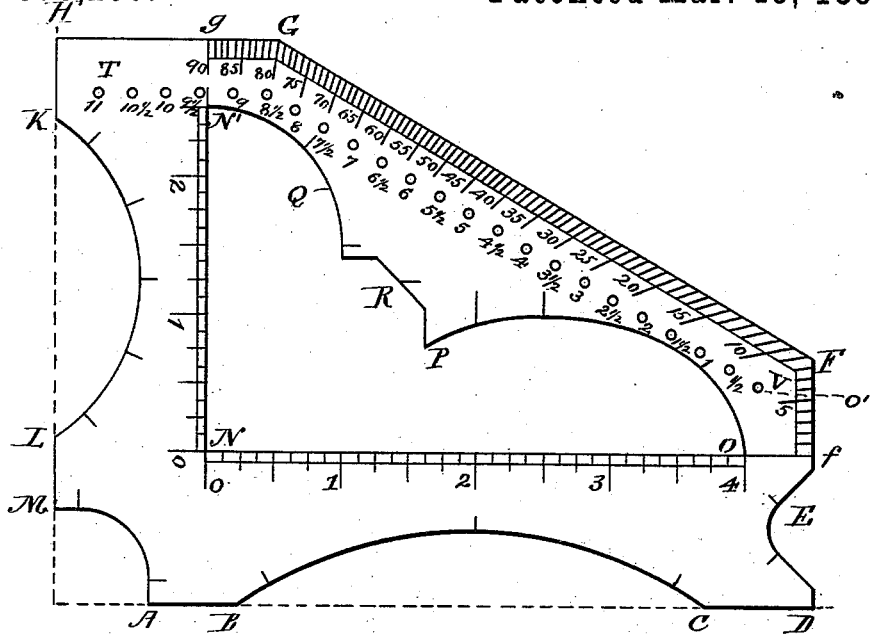
Fig. 1.
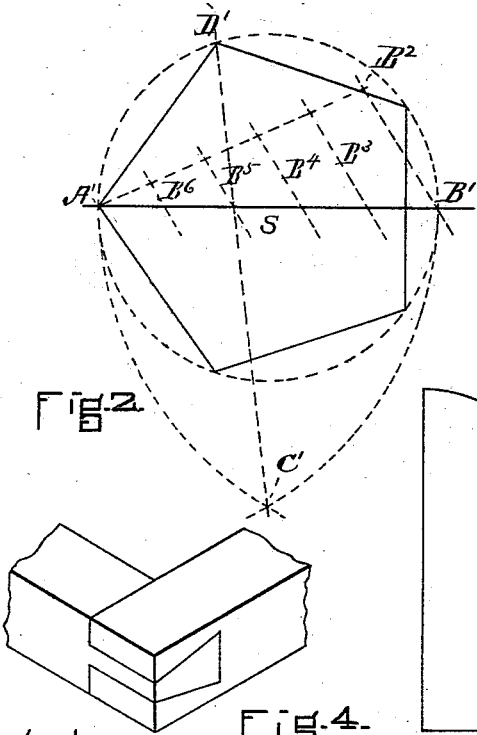
Fig. 2.
Fig. 4.
WITNESSES
Matthew M. Blunt
Arthur S. Davis
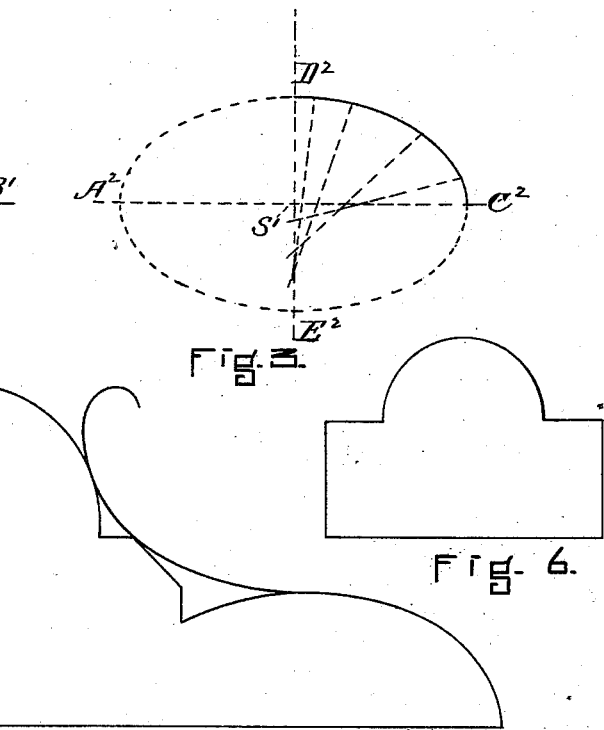
Fig. 3.
Fig. 6.
Fig. 5.
INVENTOR
Walter F. Brackett
per Frank G. Parker Atty
N. PETERS. Photo-Lithographer, Washington, D.C.

UNITED STATES PATENT OFFICE.

WALTER F. BRACKETT, OF MELROSE, MASSACHUSETTS.

DRAWING IMPLEMENT.

SPECIFICATION forming part of Letters Patent No. 379,206, dated March 13, 1888.

Application filed December 12, 1887. Serial No. 257,725. (No model.)

*To all whom it may concern:*

Be it known that I, WALTER F. BRACKETT, of Melrose, in the county of Middlesex and State of Massachusetts, have invented certain new and useful Improvements in Drawing Implements, of which the following, taken in connection with the accompanying drawings, is a specification.

The object of my invention is to combine in a single implement a series of templet lines so combined as to admit of their being used for the purpose of designing; also, in combining in the same instrument a graduated scale for the purpose of measuring angles and a graduated scale for measuring lengths; also, edges for giving rectangular lines and lines at an inclination to each other of thirty and sixty degrees. These objects I attain by the construction of the implement which I have shown in the drawings.

In the drawings, Figure 1 shows a plan view of my implement; and Figs. 2, 3, 4, 5, and 6 illustrate a few of the uses of my instrument.

My improved drawing implement is made substantially in the form shown in Fig. 1, and may be made of any suitable material—such as brass plate, hard rubber, or firm paper. The outline of this implement consists of straight lines AB, CD, fF, FG, GH, HK, and LM, and curves KL, MA, BC, and E. The interior lines consist of the graduated line NO and the graduated line NN', the line NN' being at right at right angles to the line NO. I also have as interior lines the compound curve OP, the octagonal sector R, and the curve Q. For measuring angles, I graduate the lines fF gG into degrees, N being the center. I also have in this implement a series of small holes, VT, fixed at regular distances from each other, and designated by figures which indicate their respective distances from the first one at V.

To use my device, I proceed as follows: To make a circle, as indicated at Fig. 2, I insert a pin in the opening designated at $o'$, and, placing a pencil in the opening designated 3, I draw the circle A' D' B', the pin through $o'$ being located at S. To divide a line, A' B', Fig. 2, for instance, into equal parts, (five in this case,) I place the point O of the instrument at the point A', Fig. 2, and now swing it round to a position, A' B², and making a point at B², which will be at a distance on the scale NO of five equal divisions. Now divide the line A' B² by the divisions on the scale NO into five parts and draw a line from B² to B'. Now draw the parallels B³ B⁴ B⁵ B⁶ and their intersections with the line A' B' will be at equal intervals.

With my implement I can draw any regular polygon sufficiently accurate for all ordinary purposes. To lay out a regular polygon with my implement, I first draw the circumscribing circle A' D' B', Fig. 2, then divide the diameter A' B' into equal parts, (five in this case,) as has already been described. Now using A' as a center and A' B' as a radius, describe the arc B' C', and, using B' as a center, describe the arc A' C'. Now, through the intersections C' of these two arcs and through the intersection of the line B⁵ with the line AB', draw the line C' D'. Now draw the cord line A' D'. This will be one side of the required polygon, (a pentagon in this case.)

To draw an ellipse with my device, I first lay out the two required diameters—that is, a longitudinal diameter, A² C², and a transverse diameter, E² D². Now I measure with the scale ON the length of the semi-longitudinal line S' C², and using this length as a radius-vector, I measure on it the semi-diameter of the transverse axis. Now, to find points in the arc of the ellipse, I place the extreme end of the radius-vector on the transverse diameter, and the point that indicates the difference between the semi-conjugate diameter on the longitudinal diameter A² C² and the zero-point 0 of the scale will indicate a point in the arc of the ellipse. After having located a number of these points, the curve may be drawn by using the edge OP and portions of the other curved lines in my implement.

To make an isometrical drawing, I use the angles G and F and the right angle N. (For illustration, see Fig. 4.) Figs. 5 and 6 are composed of combinations of lines shown in my implement, the construction being so simple as not to require a detail description.

This implement may be used for plotting a great variety of designs, and also for solving a great many geometrical problems.

I claim—

1. As a drawing implement, a plate constructed with line HK LM at right angles to the lines AB CD, and with curves KL BC, also with curves and tangents M, A, and E, and having an edge, FG, making an angle of one hundred and twenty degrees with the edge H G, also having a graduation of angular degrees and a point to indicate the center of degree graduation, substantially as described, and for the purpose set forth.

2. In a drawing implement, a plate constructed with an interior opening bounded on two sides by straight lines at right angles to each other, and on the other side by compound curved lines NQ PO and an octagonal sector, R, substantially as described, and for the purpose set forth.

In testimony whereof I have signed my name to this specification, in the presence of two subscribing witnesses, on this 9th day of December, A. D. 1887.

WALTER F. BRACKETT.

Witnesses:
FRANK G. PARKER,
MATTHEW M. BLUNT.